US010435277B1

(12) United States Patent
Stubbs

(10) Patent No.: US 10,435,277 B1
(45) Date of Patent: Oct. 8, 2019

(54) PORTABLE CRANE FOR MAINTAINING A WIND TURBINE GENERATOR

(71) Applicant: J & M TURBINE TOOLS, LLC, Edmond, OK (US)

(72) Inventor: Gerald F. Stubbs, Pampa, TX (US)

(73) Assignee: J & M Turbine Tools, LLC, Edmond, OK (US)

( * ) Notice: Subject to any disclaimer, the term of this patent is extended or adjusted under 35 U.S.C. 154(b) by 313 days.

(21) Appl. No.: 15/599,871

(22) Filed: May 19, 2017

(51) Int. Cl.
 *B66C 23/20* (2006.01)
 *B66C 23/18* (2006.01)
 *F03D 80/50* (2016.01)
 *B66C 23/82* (2006.01)

(52) U.S. Cl.
 CPC ............ *B66C 23/207* (2013.01); *B66C 23/18* (2013.01); *B66C 23/828* (2013.01); *F03D 80/50* (2016.05); *B66C 23/20* (2013.01); *B66C 23/826* (2013.01); *F05B 2240/916* (2013.01)

(58) Field of Classification Search
 CPC ....... B66C 23/207; B66C 23/20; B66C 23/18; B66C 23/826; B66C 23/828; F03D 80/50; F05B 2240/916
 See application file for complete search history.

(56) References Cited

U.S. PATENT DOCUMENTS

| | | | | |
|---|---|---|---|---|
| 845,143 A * | 2/1907 | Taylor | ...................... | B66C 23/20 212/179 |
| 2,509,950 A * | 5/1950 | Zierke | ................... | B60P 1/5433 212/202 |
| 3,762,068 A | 10/1973 | Clay | | |
| 4,161,068 A | 7/1979 | McMaster | | |
| 4,356,635 A | 11/1982 | Chung | | |
| 4,356,636 A | 11/1982 | Chung | | |
| 4,570,168 A | 2/1986 | Sjordal et al. | | |
| 4,709,485 A | 12/1987 | Bowman | | |
| 4,989,340 A | 2/1991 | Dawson | | |
| 5,211,526 A * | 5/1993 | Robinette | ............. | B60P 1/5471 212/238 |
| 5,431,526 A * | 7/1995 | Peterson | ............... | B60P 1/5433 212/223 |
| 5,445,487 A * | 8/1995 | Koscinski, Jr. | ........ | B60P 1/5433 212/232 |
| 5,479,718 A | 1/1996 | Cook | | |
| 5,517,464 A | 5/1996 | Lerner et al. | | |
| 5,617,963 A * | 4/1997 | Baziuk | .................. | B66C 23/208 212/179 |

(Continued)

*Primary Examiner* — Michael E Gallion
(74) *Attorney, Agent, or Firm* — Hall Estill Attorneys at Law

(57) ABSTRACT

An apparatus for maintaining a wind turbine generator includes at least, but is not limited to, a wind turbine connected to a wind turbine generator, the wind turbine generator is supported by a generator platform, a gearbox disposed between the wind turbine and said wind turbine generator, and a break assembly disposed between the gearbox and the wind turbine generator. The generator platform provides at least one maintenance stud adjacent the wind turbine generator, which is used to secure a portable crane to the generator platform. The portable crane includes at least, but is not limited to, a support member secured to a mounting plate, the support member extends from the mounting plate in an upward direction and at an angle that is less than a ninety degree angle relative to said mounting plate.

20 Claims, 4 Drawing Sheets

(56) References Cited

U.S. PATENT DOCUMENTS

| | | | | |
|---|---|---|---|---|
| 5,752,799 | A * | 5/1998 | Carey | B60P 1/5471 |
| | | | | 224/403 |
| 5,896,672 | A | 4/1999 | Harris | |
| 5,920,999 | A | 7/1999 | Hutter | |
| 5,987,767 | A | 11/1999 | Roddie | |
| 6,138,991 | A * | 10/2000 | Myers, Jr. | B66C 23/44 |
| | | | | 212/180 |
| 6,148,533 | A * | 11/2000 | Hutter | B25B 27/16 |
| | | | | 33/412 |
| 6,161,296 | A | 12/2000 | Davio | |
| 6,499,610 | B2 * | 12/2002 | Spitsbergen | B66C 23/44 |
| | | | | 212/179 |
| 6,533,246 | B1 | 3/2003 | Hulligan | |
| 6,574,878 | B2 | 6/2003 | Cross | |
| 6,651,353 | B1 | 11/2003 | Evans et al. | |
| 6,784,986 | B2 * | 8/2004 | Lysen | G01B 11/272 |
| | | | | 33/286 |
| 6,786,343 | B1 * | 9/2004 | Porebski | B66C 23/203 |
| | | | | 212/166 |
| 6,983,525 | B2 | 1/2006 | Moreno | |
| 7,111,407 | B2 | 9/2006 | Jones | |
| 7,350,770 | B1 * | 4/2008 | Boyer | B66C 23/02 |
| | | | | 212/295 |
| 7,377,740 | B2 * | 5/2008 | Panzarella | B60P 1/5433 |
| | | | | 212/180 |
| 7,460,977 | B2 | 12/2008 | Stromberg et al. | |
| 7,484,312 | B2 | 2/2009 | Morgan | |
| 74,843,112 | | 2/2009 | Morgan | |
| 7,681,747 | B2 * | 3/2010 | Crowder | B66C 23/22 |
| | | | | 212/166 |
| 8,043,048 | B2 | 10/2011 | Daniels et al. | |
| 8,196,304 | B1 * | 6/2012 | McBride | G01B 11/272 |
| | | | | 33/412 |
| 8,683,708 | B2 | 4/2014 | McBride | |
| 8,850,679 | B2 | 10/2014 | Bender | |
| 9,033,165 | B2 * | 5/2015 | Aus | B66C 23/64 |
| | | | | 212/296 |
| 9,061,381 | B1 | 6/2015 | McBride | |
| 9,120,652 | B2 * | 9/2015 | Munk-Hansen | B66C 23/18 |
| 9,487,152 | B2 * | 11/2016 | Scott | B60P 3/40 |
| 9,630,816 | B1 * | 4/2017 | Napieralski | B66C 23/06 |
| 9,643,289 | B1 | 5/2017 | McBride | |
| 9,651,020 | B2 * | 5/2017 | Holloway | B66C 23/207 |
| 2003/0183594 | A1 * | 10/2003 | Torres Martinez | B66C 23/207 |
| | | | | 212/196 |
| 2011/0131898 | A1 | 6/2011 | Nies et al. | |
| 2012/0023864 | A1 | 2/2012 | Zheng et al. | |
| 2012/0131809 | A1 | 5/2012 | Sahm | |
| 2012/0246951 | A1 | 10/2012 | McBride | |
| 2015/0010386 | A1 * | 1/2015 | Sue | G01M 15/14 |
| | | | | 415/118 |
| 2015/0086367 | A1 * | 3/2015 | Holloway | B66C 23/207 |
| | | | | 416/146 R |

* cited by examiner

PORTABLE CRANE FOR MAINTAINING A WIND TURBINE GENERATOR

FIELD OF THE INVENTION

This invention relates to new and useful improvements in wind turbine generator maintenance. In particular, but not by way of limitation, those improvements relate to a method and apparatus for alignment motors of a wind turbine generator, and break assemblies of a wind turbine generators.

BACKGROUND

Wind turbine generators for generating electric power using wind power, which is a natural form of energy, are known. Such a wind turbine generator includes a nacelle disposed on a tower. The nacelle includes a rotor head equipped with blades, a main shaft connected to the rotor head so as to integrally rotate with the rotor head, a gearbox connected to the main shaft that rotates upon receiving the wind power supplied to the blades, and a generator driven by a shaft output from the gearbox. Additionally, the nacelle further includes alignment motors and an associated gear ring, which work in unison to optimally position the nacelle, rotor head, and blades in accordance with the direction from which the wind is blowing. According to the wind turbine generator having this structure, the rotor head is equipped with the blades which convert wind power into a rotational force, and the main shaft rotates to generate a shaft output. The rotational speed is increased via the gearbox connected to the main shaft and the resulting shaft output is transmitted to the generator. Consequently, the shaft output obtained by converting the wind power into the rotational force is used as a driving source of the generator, and thus power generation can be performed using the wind power as motive power for the generator.

Since recent wind turbine generators tend to increase their output by increasing the size thereof, the sizes of components such as the rotor head, the main shaft, the gearbox, and the generator also increase, resulting in an increase in weight, and an increase in the need to assure alignment between the gearbox shaft and the generator main shaft. Misalignment can lead to premature and costly failures of the system, as well as loss in income due to the inability to generate energy.

Accordingly, as market pressures continue to demand wind turbine systems that provide lower cost, greater reliability, and longer service lives, challenges remain and a need persists for improvements in methods and apparatuses for use in the maintenance of wind turbine systems.

SUMMARY OF THE INVENTION

In accordance with an embodiment, an apparatus for maintaining a wind turbine generator is provided, which includes at least, but is not limited to, a wind turbine connected to a wind turbine generator, the wind turbine generator is supported by a generator platform, a gearbox disposed between the wind turbine and said wind turbine generator, and a break assembly disposed between the gearbox and the wind turbine generator. The generator platform provides at least one maintenance stud adjacent the wind turbine generator, which is used to secure a portable crane to the generator platform. The portable crane includes at least, but is not limited to, a support member secured to a mounting plate, the support member extends from the mounting plate in an upward direction and at an angle that is less than a ninety degree angle relative to said mounting plate.

These and various other features and advantages that characterize the claimed invention will be apparent upon reading the following detailed description and upon review of the associated drawings.

DESCRIPTION OF THE PREFERRED EMBODIMENTS

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
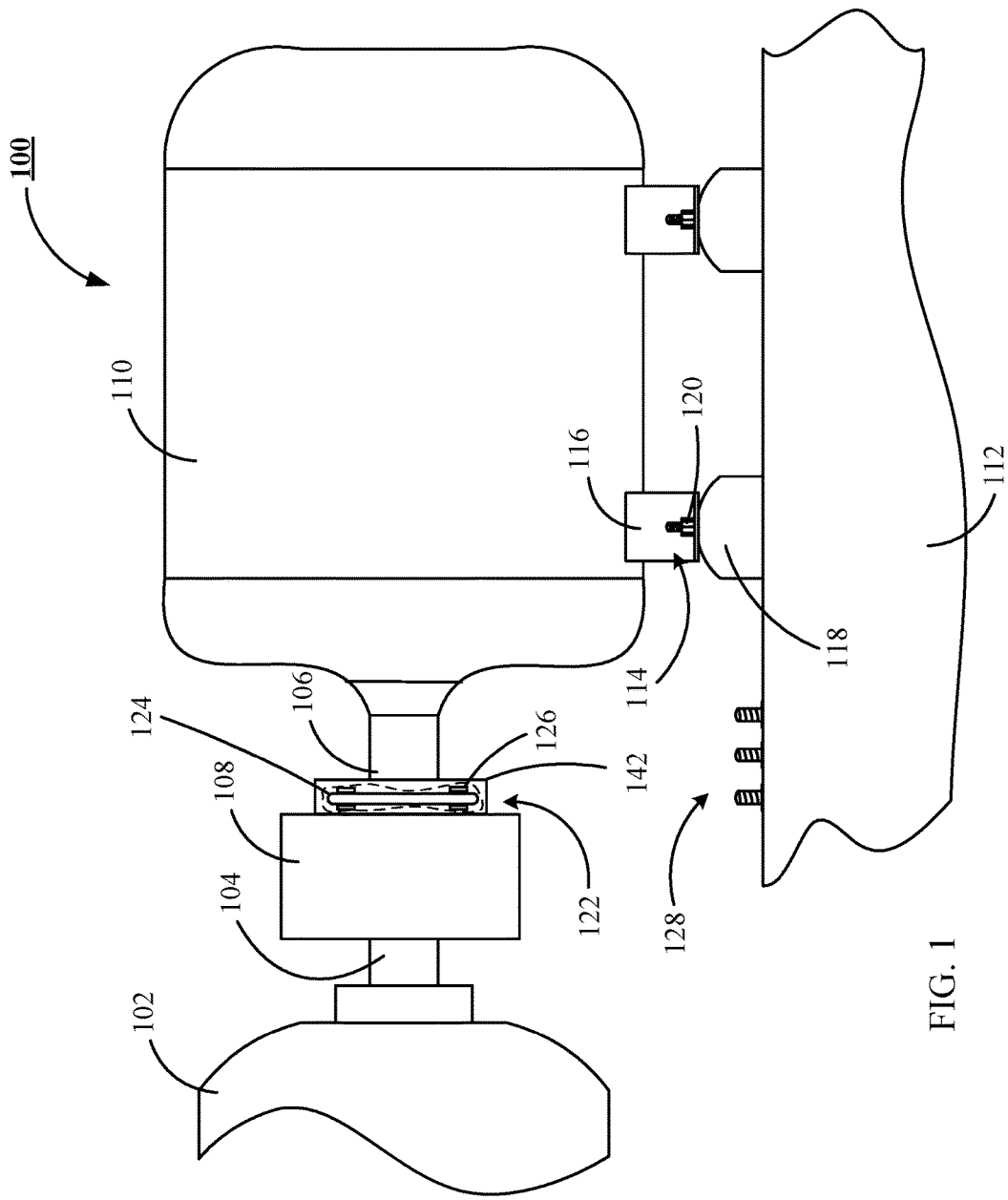
FIG. 1 shows a side elevation view in partial cutaway of a preferred embodiment wind turbine generator system.

Referring to the drawings, illustrated by FIG. 1, is a preferred wind powered electric generating system 100, which includes a wind turbine 102, a wind turbine output shaft 104 secured to a wind turbine generator input shaft 106 by way of a gearbox 108. In a preferred embodiment, a wind turbine generator 110 (also referred to herein as generator 110), supporting the wind turbine generator input shaft 106, is secured to a generator platform 112 by a plurality of securement studs 114. Preferably, a plurality of support flanges 116, corresponding to each of the plurality of securement studs 114 are attached to the generator 110. Each support flange 114 is preferably isolated from the generator platform 112 by a corresponding isolation pad 118, and held under a compressive load adjacent its associated isolation pad 118 by a flange retainer 120. It is noted that the securement stud 114 is a rigid structural member, held in a fixed position, relative to the support flange 116, by the generator platform 112. In a preferred embodiment, the wind powered electric generating system 100 further includes a break assembly, which preferably provides a brake disk 124 (also referred to as a brake rotor 124), and corresponding brake calipers 126.

In a preferred embodiment, the generator platform 112 provides a plurality of maintenance studs 128, distributed in various locations within the nacelle of the wind powered electric generating system 100. FIG. 1, shows a maintenance stud 128, adjacent the brake assembly. There are a plurality of pattern configurations in which the maintenance stud may be presented, to which a mounting plate 130, of FIG. 2, is configured to adapt to.

Figure 2:
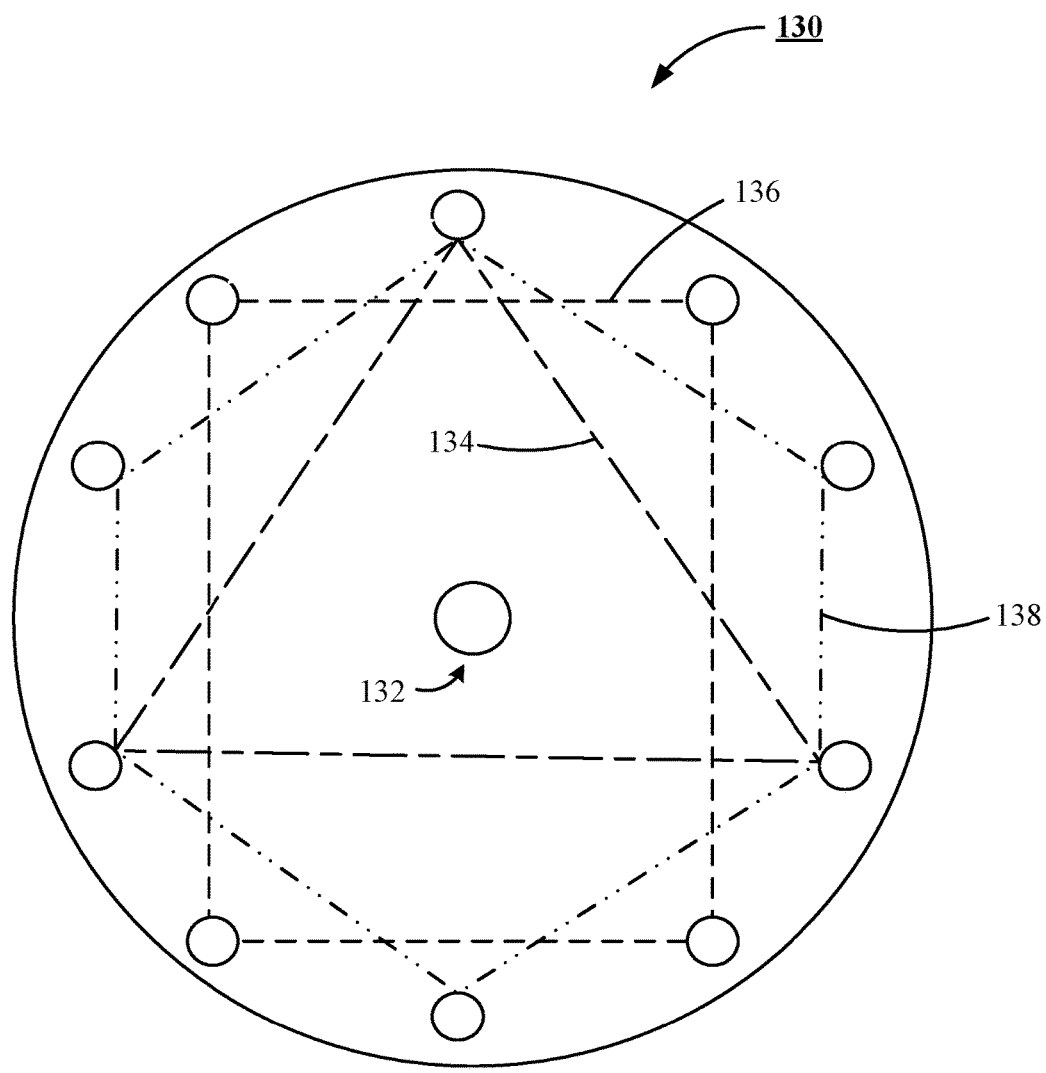
FIG. 2 shows a top plan view of a mounting plate of a portable crane, configured to interact with the wind turbine generator system of FIG. 1.

To illustrate a selection of patterns that the maintenance studs 128, may be presented, but not by way of a limitation, we turn to FIG. 2, which shows a mounting plate 130, adapted to accommodate configuration patterns to which the maintenance studs 128, may be presented. Those patterns include, but are not limited to: a single stud 132 aperture; a triangular pattern aperture configuration 134; a square pattern aperture configuration 136; and a hexagonal pattern aperture configuration 138.

During operation of the wind powered electric generating system 100, misalignment between the wind turbine output shaft 104, and the wind turbine generator input shaft 106 may occur, necessitating a realignment of the wind turbine output shaft 104 with the wind turbine generator input shaft 106. Such a misalignment may cause uneven and excess ware of the brake assembly 122, which requires a replacement of the rotor 124, and/or the brake calipers 126.

Figure 3:
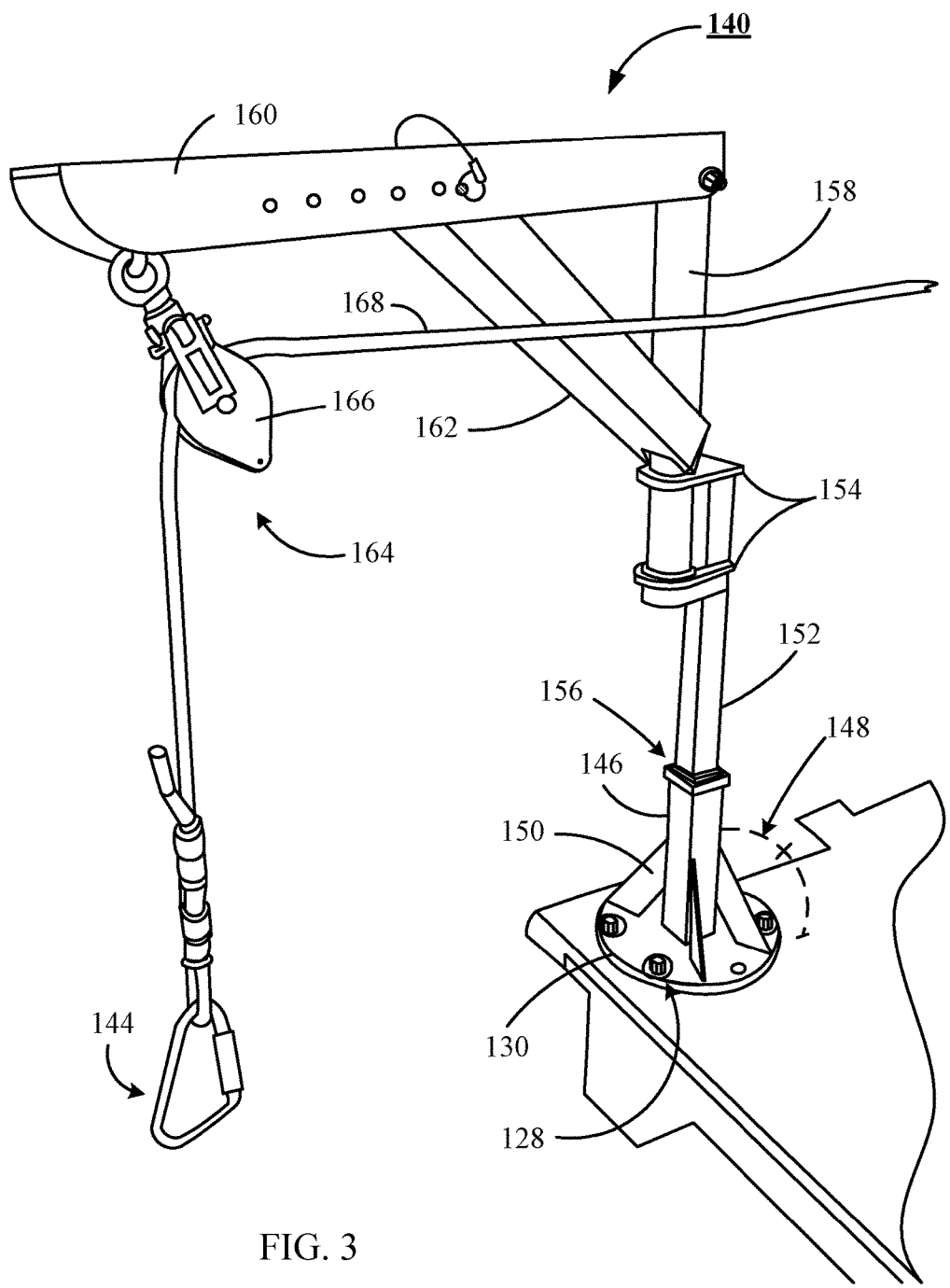
FIG. 3 shows a partial cutaway, perspective view of a portable crane, configured to interact with the wind turbine generator system of FIG. 1.

A preferred process of repairing, or replacing, the rotor 124, of the brake assembly 126, includes at least the steps of: securing a portable crane, such as portable crane 140, of FIG. 3, to the maintenance studs 128, adjacent the brake assembly 122; removing a brake assembly housing 142; removing brake calipers 126; loosening the rotor 124; securing an end effector, such as 144 (of FIG. 3) to the rotor 124; remove rotor mounting hardware from the rotor 124; hoisting the rotor from its mounted position using the portable crane 140; lowering the rotor 124, onto the generator platform 112; decoupling the end effector from the rotor 124; securing the end effector to a replacement rotor; hoisting the replacement rotor into its mounting position with the portable crane 140; aligning the replacement rotor into its mounting position; start the rotor mounting hardware; decouple the end effector 144, from the replacement rotor; tighten the rotor hardware to a predetermined torque level; install new calipers; and reattach the brake assembly housing.

FIG. 3 shows a preferred embodiment of the portable crane 140, is in mating adjacency with, and secured to, the generator platform 112. Preferably, the portable crane 140 includes at least a support member 146, secured to a mounting plate 130. The support member 146, extends from the mounting plate 130, in an upward direction and at an angle 148, which is preferably less than a ninety degree angle, relative to the mounting plate 130.

In a preferred embodiment, the portable crane 140, further includes, but is not limited to: a gusset 150, secured to each the mounting plate 130, and the support member 146; an extension member 152, communicating with, and extending from, the support member 146; an arm support 154, secured to the extension member 152, the arm support 154, is distal from a point of communication 156, between the extension member 152, and the support member 146; and a rotatable stay 158, communicating with the arm support 154.

Sill further, in a preferred embodiment, the portable crane 140 includes at least, but is not limited to: an arm 160, secured to the rotatable stay 158; a brace 162, disposed between and secured to each the arm 160, and the rotatable stay 158; and a rigging 164, supported by and secured to the arm 160. In a preferred embodiment, the rigging includes at least, but is not limited to, a sheave 166, with a line 168, and the end effector 144, secured to the line 168.

Figure 4:
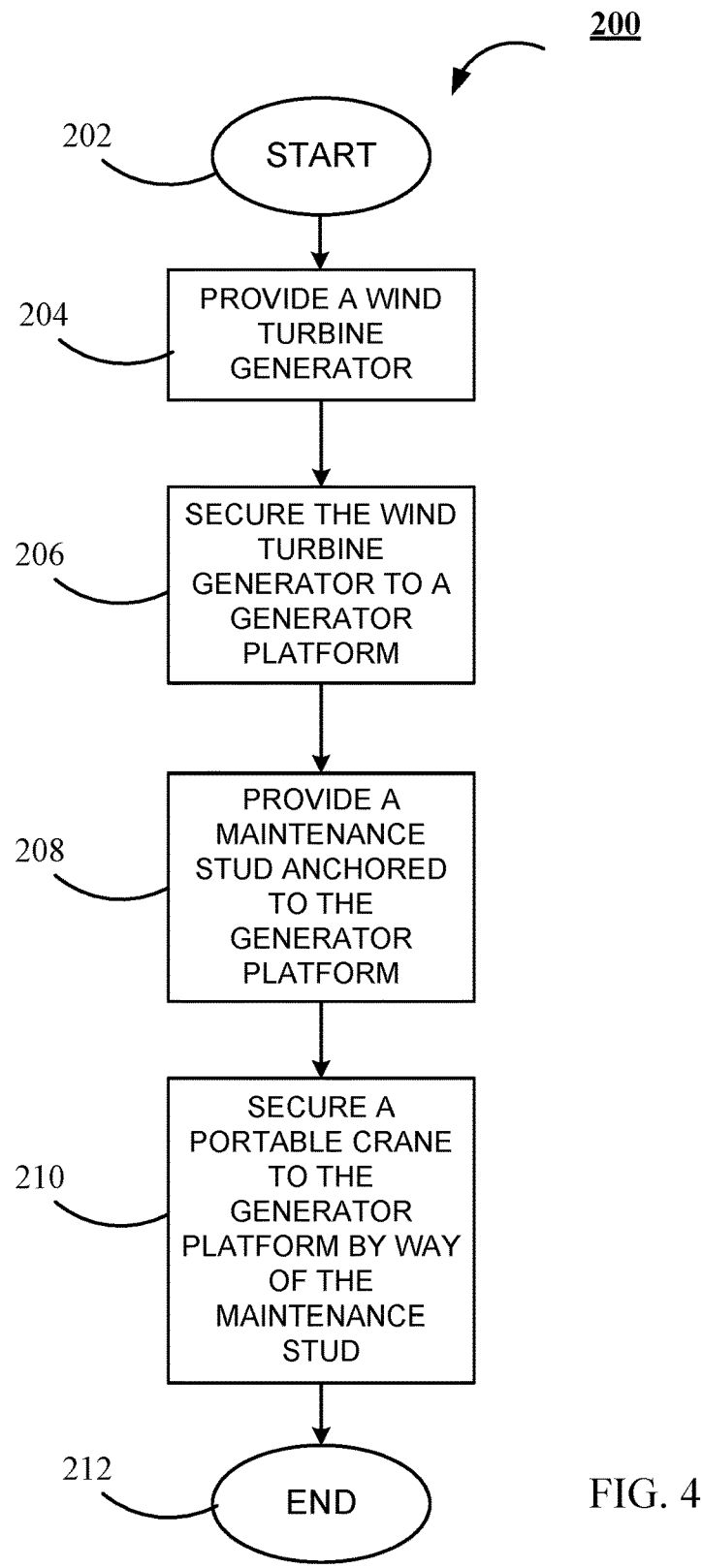
FIG. 4 shows a flowchart of a method of securing the portable crane of FIG. 2, to a generator platform, of the wind turbine generator system of FIG. 1.

Shown by FIG. 4, is a preferred method 200, of mounting a portable crane, (such as 140 of FIG. 3), to a generator platform, (such as 112 of FIG. 3). The method 200, of mounting a portable crane to a generator platform includes at least, but is not limited to, the steps commencing at start step 202, and proceeding to process step 204, of providing a wind turbine generator (such as 102, of FIG. 1), and securing the wind turbine generator to a generator platform (such as 112, of FIG. 1) at process step 206. The process continues with process step 208, with providing a maintenance stud (such as 128 of FIG. 1), which is preferably anchored to the generator platform and adjacent the wind turbine generator. At process step 210, the portable crane is secured to the generator platform by way of the maintenance stud, and the process concludes with end step 212.

In a preferred embodiment, the portable crane preferably has a support member (such as 146, of FIG. 3) secured to a mounting plate (such as 130, of FIG. 3), and wherein the support member extending from the mounting plate in an upward direction and at an angle that is less than a ninety degree angle (such as 148, of FIG. 3) relative to the mounting plate.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. An apparatus comprising:
a wind turbine;
a wind turbine generator supported by a generator platform, said wind turbine generator communicating with said wind turbine;
a gearbox disposed between said wind turbine and said wind turbine generator;
at least one break assembly disposed between said gearbox and said wind turbine generator;
a maintenance stud provided by said generator platform and adjacent said wind turbine generator; and
a portable crane secured to said maintenance stud, said portable crane having a support member secured to a mounting plate, said support member extends from said mounting plate in an upward direction and at an angle that is less than a ninety degree angle relative to said mounting plate;
the portable crane having an end effector secured to the at least one break assembly for aligning the at least one break assembly with the gearbox.

2. The apparatus of claim 1, in which the maintenance stud is a plurality of maintenance studs provided in a predetermined pattern.

3. The apparatus of claim 2, in which the predetermined pattern is a hexagon shaped pattern.

4. The apparatus of claim 2, in which the predetermined pattern is a square shaped pattern.

5. The apparatus of claim 3, in which the mounting plate provides a plurality of maintenance studs apertures corresponding to the hexagon shaped pattern of the maintenance studs.

6. The apparatus of claim 1, in which said portable crane further comprising a gusset secured to each said support member and said mounting plate.

7. The apparatus of claim 6, in which the gusset is a plurality of gussets, wherein the gussets are sized to accommodate and maintain said less than ninety degree angle between said support member and said mounting plate.

8. The apparatus of claim 1, in which said portable crane further comprising:
   a gusset secured to each said mounting plate and said support member;
   an extension member communicating with and extending from said support member;
   an arm support secured to said extension member, said arm support distal from a point of communication between said extension member and said support member; and
   a rotatable stay communicating with said arm support.

9. The apparatus of claim 8, in which said portable crane further comprising:
   an arm secured to said rotatable stay;
   a brace disposed between and secured to each said arm and said rotatable stay; and
   a rigging supported by and secured to said arm.

10. The apparatus of claim 9, in which said rigging includes at least, but is not limited to, a sheave with a line, and the end effector secured to the line.

11. The apparatus of claim 10, which said maintenance stud is a plurality of maintenance studs provided in a predetermined pattern.

12. The apparatus of claim 11, in which said predetermined pattern is a hexagon shaped pattern.

13. The apparatus of claim 12, in which said mounting plate provides a plurality of maintenance studs apertures corresponding to said hexagon shaped pattern of said maintenance studs.

14. The apparatus of claim 11, in which the predetermined pattern is a square shaped pattern.

15. The apparatus of claim 14, in which said mounting plate provides a plurality of maintenance studs apertures corresponding to said square shaped pattern of said maintenance studs.

16. A method by steps comprising: a wind turbine;
   providing a wind turbine generator, said wind turbine generator supported by a generator platform;
   a gearbox disposed between said wind turbine and said wind turbine generator; at least one break assembly disposed between said gearbox and said wind turbine generator;
   providing a maintenance stud secured to said generator platform and adjacent said wind turbine generator; and
   securing a portable crane to said generator platform by way of said maintenance stud, said portable crane having a support member secured to a mounting plate, said support member extending from said mounting plate in an upward direction and at an angle that is less than a ninety degree angle relative to the mounting plate;
   the portable crane having an end effector secured to the at least one break assembly for aligning the at least one break assembly with the gearbox.

17. The method of claim 16, in which said portable crane further comprising:
   a gusset secured to each said mounting plate and said support member;
   an extension member communicating with and extending from said support member;
   an arm support secured to said extension member, said arm support distal from said a point of communication between said extension member and said support member; and
   a rotatable stay communicating with said arm support.

18. The method of claim 17, in which said portable crane further comprising:
   an arm secured to said rotatable stay;
   a brace disposed between and secured to each said arm and rotatable stay; and
   a rigging supported by and secured to said arm.

19. The method of claim 18, in which said rigging includes at least, but is not limited to, a sheave with a line, and the end effector secured to the line.

20. The method of claim 19, which said maintenance stud is a plurality of maintenance studs provided in a predetermined pattern.

\* \* \* \* \*